(12) United States Patent
Shi et al.

(10) Patent No.: US 8,073,838 B2
(45) Date of Patent: *Dec. 6, 2011

(54) PSEUDO-ANCHOR TEXT EXTRACTION

(75) Inventors: Shuming Shi, Beijing (CN); Ji-Rong Wen, Beijing (CN); Mingjie Zhu, Hefei Anhui (CN); Fei Xing, Beijing (CN); Zaiqing Nie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,056

(22) Filed: Jan. 29, 2010

(65) Prior Publication Data

US 2010/0145956 A1    Jun. 10, 2010

Related U.S. Application Data

(63) Continuation of application No. 11/681,682, filed on Mar. 2, 2007, now Pat. No. 7,657,507.

(51) Int. Cl.
*G06F 17/30* (2006.01)
(52) U.S. Cl. ...................................... 707/713
(58) Field of Classification Search .......... 707/609, 707/637, 705, 713, 769, 802, 821; 709/223, 709/224, 231; 719/316, 317, 320
See application file for complete search history.

(56) References Cited

U.S. PATENT DOCUMENTS

| | | | |
|---|---|---|---|
| 5,920,859 A | 7/1999 | Li | |
| 6,442,696 B1 * | 8/2002 | Wray et al. | 726/5 |
| 6,636,848 B1 | 10/2003 | Aridor et al. | |
| 6,925,495 B2 | 8/2005 | Hegde et al. | |
| 2002/0169770 A1 | 11/2002 | Kim et al. | |
| 2005/0149576 A1 * | 7/2005 | Marmaros et al. | 707/200 |
| 2005/0149851 A1 | 7/2005 | Mittal | |
| 2005/0165781 A1 | 7/2005 | Kraft et al. | |
| 2006/0026496 A1 | 2/2006 | Joshi et al. | |
| 2006/0074871 A1 | 4/2006 | Meyerzon et al. | |
| 2006/0074903 A1 | 4/2006 | Meyerzon et al. | |
| 2006/0136098 A1 | 6/2006 | Chitrapura et al. | |
| 2006/0143254 A1 | 6/2006 | Chen et al. | |

FOREIGN PATENT DOCUMENTS

WO    PCT/EP05/050321    1/2005

OTHER PUBLICATIONS

Amitay, "Using Common Hypertext Links to Identify the Best Phrasal Description of Target Web Documents", available at least as eary as Jan. 24, 2007, at <<http://einat.webir.org/sigir_98.pdf>>, pp. 1-5.

(Continued)

*Primary Examiner* — Fred I Ehichioya
(74) *Attorney, Agent, or Firm* — Lee & Hayes, PLLC

(57) ABSTRACT

A search method uses pseudo-anchor text associated with search objects to improve search performance. The pseudo-anchor text may be extracted in combination with an identifier of the search objects (such as a pseudo-URL) from a digital corpus such as a collection of documents. Pseudo-anchor texts for each object are preferably extracted from candidate anchor blocks using a machine learning based approach. The pseudo-anchor texts are made available for searching and used to help rank the objects in a search result to improve search performance. The method may be used in vertical search of objects such as published articles, products and images that lack explicit URLs and anchor text information.

20 Claims, 5 Drawing Sheets

OTHER PUBLICATIONS

Attardi, et al., "Theseus: Categorization by Context," Proceedings of the 8th International World Wide Web Conference, 1999, pp. 1-2.

Bikel, et al., "Nymble: A High-Performance Learning Name-Finder," Proceedings of ANLP, 1997, pp. 194-201.

Broder, et al., "Syntactic Clustering of the Web", retrieved at <<http://www.research.digital.com/SRC>>, SRC Technical Note, Jul. 25, 1997, Digital Equipment Corporation, 1997, pp. 1-13.

Califf, et al., "Relational Learning of Pattern-Match Rules for Information Extraction," CoNLL97: Computational Natural Language Learning, ACL, 1997, pp. 9-15.

Chakrabarti, et al., "Automatic Resource Compilation by Analyzing Hyperlink Structure and Associated Text," Proceedings of the 7th International World Wide Web Conference, 1998, pp. 13.

Chang, et al., "A Chinese-to-Chinese Statistical Machine Translation Model for Mining Synonymous Simplified-Traditional Chinese Terms", National Chi-Nan University, 1994, pp. 242-247.

"CiteSeer.IST Scientific Literature Digital Library", available as early as Feb. 26, 2007, retrieved on Apr. 4, 2007, at <<http://citeseer.ist.psu.edu>>, 1 pg.

Collins, et al.,"Unsupervised Models for Named Entity Classification," Proceedings of the Joint SIGDAT Conference on Empiracal Methods in Natural Language Processing, 1999, pp. 100-110.

Davison, "Topical Locality in the Web", ACM, Proceedings of SIGIR, 2000, pp. 272-279.

Freitag, "Information Extraction from HTML: Application of a General Machine Learning Approach," Proceedings of the 15th Conference on Artificial Intelligence, 1998, 7 pgs.

Giles, et al., "CiteSeer: An Automatic Citation Indexing System", ACM, Proceedings of the 3rd ACM Conference on Digital Libraries (DL'98), 1998, pp. 89-98.

Haveliwala, et al., "Evaluating Strategies for Similarity Search on the Web", ACM, WWW2002, May 7-11, 2002, pp. 1-10.

Lawrence, et al., "Digital Libraries and Autonomous Citation Indexing", IEEE, 1999, pp. 67-71, vol. 32, No. 6.

Levenshtein, "Binary Codes Capable of Correcting Deletions, Insertions and Reversals," Soviet Physics, Doklady, 1966, pp. 707-710.

Lu, et al., "A Transitive Model for Extracting Translation Equivalents of Web Queries through Anchor Text Mining", available at least as eary as Jan. 24, 2007, at <<http://delivery.acm.org/10.1145/1080000/1072236/p8-lu.pdf?key1=1072236&key2=0538359611&coll=GUIDE&dl=GUIDE&CFID=12180585&CFTOKEN=46372023>>, pp. 1-7.

Lu et al. "Anchor Text Mining for Translation of Web Queries: A Transitive Translation Approach", ACM Transactions on Information System, vol. 22, No. 2, Apr. 2004, pp. 242-269.

McBryan, "GENVL and WWWW: Tools for Taming the Web", First International Conference on the World Wide Web, CERN, May 1994, pp. 1-12, Geneva, Switzerland.

Muslea, "Extraction Patterns for Information Extraction Tasks: A Survey", American Association for Artificial Intelligence, 1999, 6 pgs.

Nie et al, "Extracting Objects from the Web," ICDE, 2006, pp. 1-3.

Nie, et al., "Object-Level Ranking: Bringing Order to Web Objects," ACM, WWW2005, May 10-14, 2005, pp. 567-574.

Shi, et al., "Pseudo-Anchor Text Extraction for Vertical Search", Microsoft Technique Report, MSR-TR-2006-122, Aug. 2006, 6 pgs.

Yin et al., "Towards Understanding the Functions of Web Element", Springer-Verlag, 2004 AIRS, 2005, pp. 313-324.

Yu et al, "Improving Pseudo-Relevance Feedback in Web Information Retrieval Using Web Page Segmentation," ACM, WWW2003, May 20-24, 2003, 8 pgs, Budapest, Hungary.

Zhu et al, "Simultaneous Record Detection and Attribute Labeling in Web Data Extraction," ACM, KDD'06, Aug. 20-23, 2006, 10 pgs.

* cited by examiner

PSEUDO-ANCHOR TEXT EXTRACTION

RELATED APPLICATION

This application is a continuation of and claims priority to U.S. patent application Ser. No. 11/681,682, filed on Mar. 2, 2007, the disclosure of which is incorporated by reference herein in its entirety.

BACKGROUND

Modern search engines commonly provide two categories of search functionalities to users: general Web search and vertical search. In general Web search, the searchable objects are generally identified by URLs (Universal Resource Locators) which are detected by the search engine through hyperlinks. Examples of general Web search include Microsoft's Windows Live™ search and Google™ search. Vertical search generally refers to searching for a class of Web objects or information in a certain domain of object or information (the term "domain" as used herein broadly refers to any field or area of information or knowledge, and is not used in a narrow sense of a network domain). Because the domain of the objects or information may often relate to a certain specialty body of knowledge, vertical search is often referred to as "specialized search". Examples of vertical search include product search, image search, academic search, article search, book search, people search, and others.

Vertical search has become an important supplement for general Web search. Different from general Web search, vertical search commonly deals with information about certain types of real-world objects instead of general Web pages identified by explicit URLs. In vertical search, an object may appear in any type of a document, such as a simple text document, an office document (e.g., Microsoft Word), a PDF document, an XML file, an email message, an instant message, a digital image file, or a HTML Web page. One document may describe multiple objects, and the same object can appear in multiple documents of different types. Even if the document itself may have an explicit URL with a hyperlink, an object that appears in the document may not be identified by an explicit URL.

For example, a document (e.g., a Web page) may contain information of a list of books, each identified by a list entry containing an image representative of the book, the author, title and publication information of the book, and perhaps also a brief summary or a snapshot of the book. The list entry of each book may or may not contain an active hyperlink that links to a URL.

For another example, information about a product (e.g., Dell™ Latitude C640) may appear in various Web sites that either offer the product for sale or contain various types of descriptive information (such as an introduction or a user review). Again, each piece of information about the product may or may not contain an active hyperlink that links to a URL.

Some current vertical search engines extract object information from the Web and provide indexing and search services for the extracted objects. For example, the structured product data of the Windows Live™ Product Search (products.live.com) and a portion of the data in Froogle™ (froogle.google.com) are extracted from the Web. Likewise, ZoomInfo (www.zoominfo.com) extracts people information from multiple Web pages and integrates the information.

As vertical search typically focuses on a specific domain (or field) or specific type of objects, it enjoys greater odds of providing rich, precise, and structured information to users by utilizing the special knowledge of the domain or field. However, although the performance of vertical search is enhanced due to its specialized nature, the performance of most vertical search domains still has substantial room for improvement. In addition to the difficulty of extracting structured information from the Web, one factor that affects the performance is that some techniques, which are demonstrated to be quite useful and critical in general Web search, have not yet been applied to most vertical object search engines. In particular, current vertical search engines often have difficulties in ranking the degree of relevance of searchable objects according to a certain search query.

One of the significant contributors to the effectiveness of general Web search is its use of URL related anchor text. Anchor text is a clickable text string that is associated with an active hyperlink link into an explicit URL. The URL points to a Web page, which is a search object in general Web search. A vast amount of Web pages are linked to each other in this manner. Modern general Web search engines usually take into account both the number of external Web pages that contained hyperlinks to the object Web page and the anchor texts of the hyperlinks.

It is known that anchor texts of the hyperlinks to a certain object Web page collectively define a valuable description of the object Web page and can be used for ranking the object Web page according to a search query. The descriptive information given by anchor texts tend to be even more valuable than the information contained in the Web page itself. This is because anchor texts are usually found in external Web pages which tend to be independent from the object Web page, and therefore provide a more objective description for the object Web page. Anchor texts effectively aggregates opinions (which can be comprehensive, accurate and objective) of an object Web page by potentially a large amount of other Web pages. The information contained in the anchor text is also less susceptible to spam. Even with link bombing, which aims at page ranking and anchor text, anchor texts are much harder to be affected than page content itself.

Anchor text thus plays an especially important role in improving the performance of general Web search. In fact, most general Web search engines now use anchor text as primary evidence for ranking in order to improve search performance. Some general Web search engines use contextual text in a certain vicinity of the anchor text to automatically compile lists of authoritative Web resources on a range of topics.

Vertical search engines, however, have not been able to take advantage of anchor text to a degree comparable to what general Web search engines have done. This is mainly because vertical search objects generally lack explicit URLs and the corresponding anchor texts that are associated with search objects.

SUMMARY

Search techniques involving documents and other digital objects lacking explicit URLs are described. The techniques utilize a concept of pseudo-anchor text to improve the performance of search. The pseudo-anchor text is extracted in combination with an identifier of the search object. In one implementation, a pseudo-URL representing a search object is used as an identifier of the search object and is extracted from a digital corpus. The pseudo-anchor contains searchable text which can be made available for searching. Using the extracted pseudo-URL, pseudo-links that link to the search object through the pseudo-URL may be identified in the digital corpus. Information of the pseudo-links may also be used for ranking search results.

Techniques for detecting and merging duplicate or redundant search objects are also described. In case where multiple pseudo-anchor texts are extracted for the same search object, techniques are disclosed for merging such duplicate pseudo-anchor texts. In some embodiments, instead of extracting pseudo-anchor text directly, a multistep approach is used for extracting pseudo-anchor text, starting from a set of candidate anchor blocks. The pseudo-anchor text extraction may be assisted using a machine-learning algorithm, such as a support vector machine (SVM) having a classifier with an input and an output.

The techniques are particularly useful for vertical search where the digital corpus consists of documents collected from a specialized information source domain or field. For example, the digital corpus may be a collection of published articles, and each object can be one of the published articles. The identifier of a published article may be a pseudo-URL including the information of title, author, publication venue, and publication time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Introduction

Figure 1:
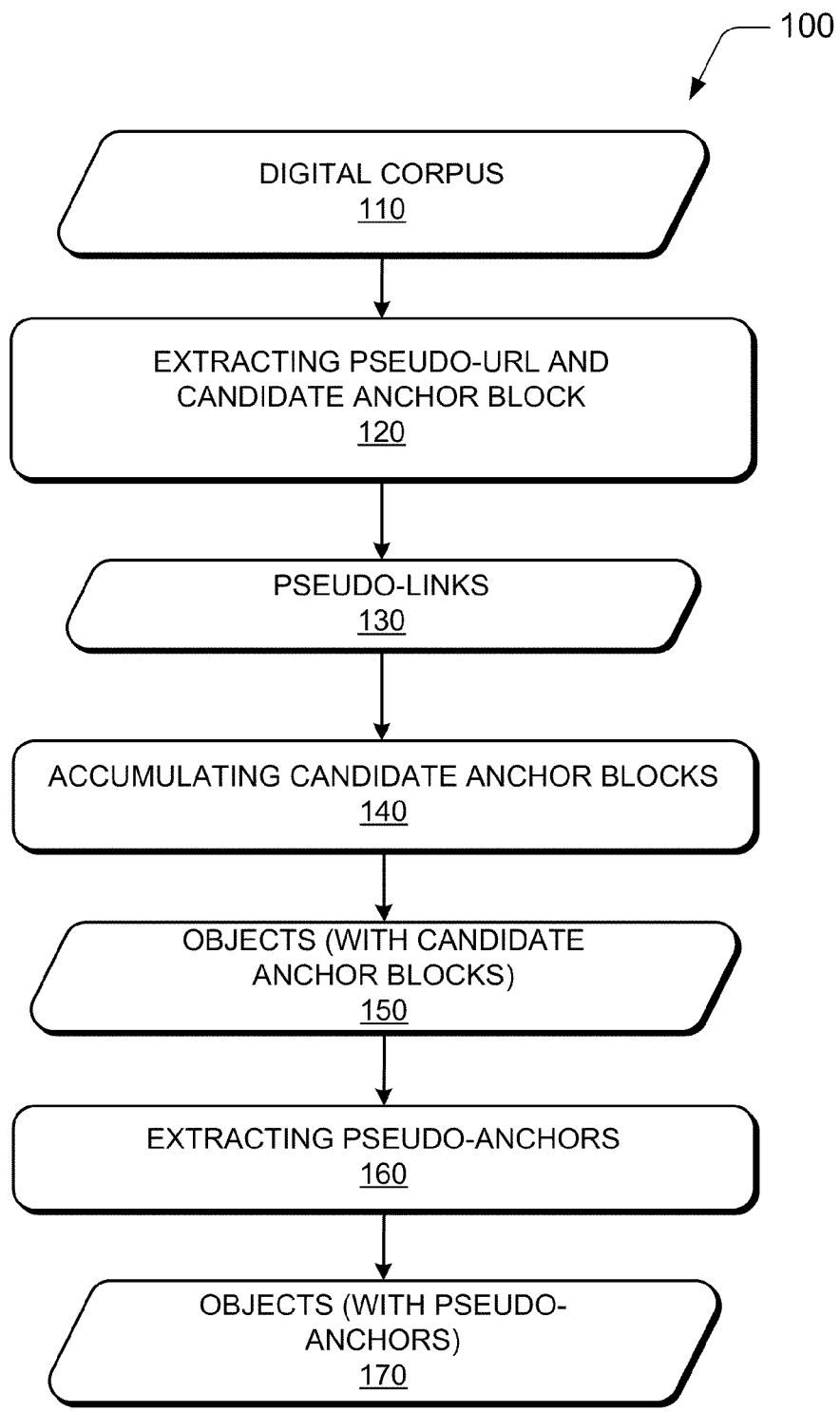
FIG. 1 shows a flow diagram of an exemplary process for extracting pseudo-URLs and pseudo-anchor text.

The search techniques described herein introduce pseudo-anchors to improve the performance of search. Pseudo-URLs are also introduced as identifiers of search objects. A pseudo-anchor is extracted in combination with an identifier (e.g., a pseudo-URL) of the search object.

In this description, a pseudo-anchor refers to a computer-extracted piece of information or a combination of several pieces of such information associated with an occurrence, or a reference, of a search object in a digital corpus. The association between a pseudo-anchor and an occurrence of a search object does not require an explicit URL. A pseudo-anchor text is generally implicit in the digital corpus and needs to be extracted using a computer algorithm. Techniques for such extraction are described herein. Once extracted, a pseudo-anchor contains searchable text which can be made available for searching.

A pseudo-URL is also used as an identifier of a search object and helps to extract a pseudo-anchor and associated pseudo-anchor text for the search object. In this description, a pseudo-URL is a resource locator which is not obtained from an explicit conventional HTML hyperlink and may not have a standard URL format. Although different from the standard URL in its origin and format, a pseudo-URL is able to identify an object in a manner analogous to how a standard URL identifies a Web resource.

One aspect of the described techniques is a computer-implemented method which extracts from a digital corpus an object and a pseudo-anchor text associated with the object. The pseudo-anchor text is then made available for searching. Especially, the pseudo-anchor text may be used to help ranking the object in a search result. The digital objects may be ranked at least partially based on the associated pseudo-anchor text. In general, the primary information extracted from the object itself (e.g., the content of a published article) may also be used, together with pseudo-anchor text, in ranking. Depending on the relevance and the quality of extracted pseudo-anchor text, various degrees of weight may be given to the pseudo-anchor text in ranking. In some applications, pseudo-anchor text may play a dominant role in ranking due to its objectiveness and collectivity.

The digital corpus may include documents collected from a specialized information source domain or field for the purpose of a vertical search. For example, the digital corpus may be a collection of published articles, and the object is one of the published articles. The digital corpus may also be a collection of documents describing products, and the object is one of the products.

In some embodiments, to extract an object, entity information concerning the object is first extracted. When the entity information includes a key information piece identifying the object, an identifier of the object may be constructed using the key information piece. For example, where the object is a published article, the identifier may be constructed using at least one of the following information of the published article: title, author, publication venue, and publication time.

In some embodiments, in order to extract a pseudo-anchor text, the method identifies an occurrence of the object in the digital corpus, and selects a candidate anchor block for the object based on the occurrence of the object. The candidate anchor block is added to a candidate anchor block set for the object. The final pseudo-anchor text is extracted from the collected candidate anchor block collection.

One aspect of the described techniques relates to identifying objects that are identical or similar. For example, as will be described further in detail below, two or more parallel objects may be extracted from the digital corpus. Each of the objects may be identified with a respective identifier. The method compares the similarity between the identifiers and treat the parallel objects as the same object if the similarity satisfies a specified threshold (e.g., greater than the threshold). In this document, the term "parallel objects" does not carry any special technical meaning other than that the objects are available for a comparison as described herein.

In one embodiment, the pseudo-anchor text may be extracted as follows. Two or more objects, each identified with a respective identifier are extracted. The method then identifies an occurrence of each object in the digital corpus, and selects a candidate anchor block based on the occurrence of each object. The identifiers of the objects are compared to determine similarity. If the similarity of two identifiers satisfies a specified threshold, their respective candidate anchor blocks are placed in the same candidate anchor block set. The final pseudo-anchor is then extracted from the candidate anchor block collection.

When pseudo-URLs are used as identifiers of such objects, the method may extract from the digital corpus multiple pseudo-URLs, and select a subgroup of the pseudo-URLs which have a similarity satisfying a specified threshold. The subgroup of the pseudo-URLs is then collectively associated with the same object. The similarity of the pseudo-URLs may be calculated using a similarity function.

As will be described further in detail below, one way to compare the similarity of the identifiers is to first group the identifiers using a hash function on the identifiers and then compare for similarity of identifiers in the same group.

When pseudo-URLs are used as identifiers, the method may also parse the digital corpus to construct pseudo-links associated with the pseudo-URL.

The described search techniques improve the performance of searching URL-lacking objects in a way analogous to how conventional anchor text improves the performance of general Web search. It is noted that as long as proper pseudo-anchors can be extracted, the identifier of a search object can be of any form. When a pseudo-URL is used as an identifier of a search object, the identification of the object may be optionally done using a pseudo-link associated with the pseudo-URL to link to the object or a resource associated with the object. Information of the pseudo-links may also be used to help ranking search results.

The pseudo-anchor is defined by the contextual description around the location (a reference point) where the search object is referenced (mentioned or cited) in a document. The reference point is identified with the identifier (such as a pseudo-URL) of the search object. The identifier represents the search object, while the pseudo-anchor text is associated with the identifier. Once defined and extracted, the pseudo-anchor text may be made available for searching and used for evaluating and ranking the search object in ways that are similar to how the general Web search engines use conventional pseudo-anchor text improve search engine performance.

The search object may be of a variety of types, including a product, an image, an academic article, a book, a person, and many others. In a vertical search application, the object is identified and the entity information thereof is extracted (using methods described herein) from a collection of Web documents collected from a specialized information source. The entity information of the object is used for formulating the pseudo-URL representing the object.

For example, a text string "The Fall of the Roman Empire—Peter Heather" may be extracted (using methods described herein) from a digital corpus. If the text string is identified to be a piece of entity information capable of identifying a book entitled "The Fall of the Roman Empire" and authored by Peter Heather, the text string may be assigned to be the pseudo-URL of the book or a part of the pseudo-URL.

As a functional aspect of the pseudo-URL, a reference to certain entity information identified with the pseudo-URL may be considered to be linked (together with the pseudo-anchor) to the search object through the pseudo-URL. Once the pseudo-URL is determined, references to the search object found in documents in the collection may be identified. Accordingly, texts surrounding the reference points are collected and analyzed to extract pseudo-anchor text associated with the pseudo-URL. Once the pseudo-URL and pseudo-anchor text of each object are determined, anchor text techniques (including both that are described herein and known in the art) can be applied in ranking search objects.

Pseudo-URL and pseudo-anchor text in accordance to the present description are much different from their counterparts in conventional URL and anchor text.

First, the conventional URL of a Web page is assigned by a person to act as a natural identifier of the page. In contrast, for search objects automatically extracted from Web pages or other types of documents, pseudo-URLs are constructed using a computer extraction method from the information extracted. The extraction method, as described herein, is preferably performed by a computer automatically.

Some pseudo-URLs may not be accurate because of extraction errors. The extraction method, therefore, is carefully designed to minimize such errors. In addition, because an object can have different descriptions on varying Web pages, two different pseudo-URLs may correspond to the same object. For example, "Dell C640" and "Dell Latitude C640" may actually represent the same object and therefore both can be considered as a pseudo-URL for the same object. Accordingly, the extraction method is designed to properly handle such duplication or redundancy.

Second, in general Web search, anchor text is always explicitly specified by Web page designers via HTML tags (<a> and </a>). This type of explicit anchor text can be easily extracted and used for Web search. However, it may not be the case for pseudo-anchor text when applied in some vertical search domains. The pseudo-anchor text of a vertical search object is often implicit and may require much effort to extract. For example, although it may be clear to a human eye that portions of text in two or more documents all related to the same object (e.g., a laptop computer Dell C640), such relationship may not be explicitly specified in the documents to be identified by a computer.

Due to the above differences, it may be a challenge to identify a pseudo-anchor and to collect the associated pseudo-anchor text. The present description discloses solutions to problems and difficulties involved in the extraction and aggregation of implicit anchor text for search objects. The disclosed techniques entail a unique approach for extracting and utilizing pseudo-anchor text information of search objects to improve search, particularly vertical object search. This approach adopts a three-phase methodology to extract pseudo-anchors. In the first phase, each time an object appearing in a document, its pseudo-URL is identified and a candidate anchor block is extracted for the object. In the second phase, candidate anchor blocks belong to the same object are grouped. In the third phase, the ultimate pseudo-anchor text of each object is extracted from the aggregated candidate blocks. State-of-the-art data integration techniques may be utilized in the second phase to accumulate candidate anchor blocks belonging to same objects. Given all information provided by the candidate blocks, a machine-learning method is also proposed to automatically assign each term in each candidate block a degree of belonging to anchor text.

The present description uses the process of extracting pseudo-anchor text for research paper objects as an example to illustrate how to apply the disclosed method to a specific search domain (academic publication in the example). Also described herein are experiments conducted based on a paper search system called Libra and the resultant search performance evaluated using queries selected from the query log. Experimental results show that useful anchor text information can be successfully extracted and accumulated using the disclosed method, and ultimate search performance can be significantly improved when pseudo-anchor information is used.

The methods for pseudo-anchor text extraction, accumulation, and utilization are described in further detail below, followed by an example in the academic domain for search research publications. The order in which the method is described is not intended to be construed as a limitation, and any number of the described method blocks may be combined in any order to implement the method, or an alternate method.

Exemplary Process

Because of the special properties of pseudo-URL and pseudo-anchor text in vertical object search, the method in accordance with the present description is more sophisticated than processing the conventional anchor text of Web pages.

FIG. 1 is a flow diagram of an exemplary process for extracting pseudo-URLs and pseudo-anchor text. The exemplary process 100 is shown in multiple blocks as described below.

At block 110, a digital corpus is assumed to have been acquired. The digital corpus may be a collection of documents, or a collection of any digital information. The documents may be of any kind of search interest, and are not required to be the same type. When Web documents (such as Web pages, PDF files, image files, and other documents accessible through the Internet) are involved, these documents may be crawled using robotic Web crawlers. The collection of documents may be placed in a computer system, such as a server having a storage device.

At block 120, pseudo-URLs and candidate anchor blocks are extracted. This step is quite different from conventional URL extraction method where each Web page is parsed (via an HTML parser) to extract links (out-links pointing to other Web pages) within each Web page. Because the links on Web pages are usually explicit HTML hyperlinks which are predetermined and easily identifiable, the conventional URL extraction used in general Web search can be as simple single-step process. In contrast, for objects lacking explicit URLs as that in a typical vertical object search, objects need to be first identified and their information extracted from documents.

In one embodiment, this is done by first analyzing the documents to find references of possible search objects. For example, when document D mentions an object A, it usually displays (explicitly or implicitly) a piece of key information of object A to indicate that it is discussing object A instead of other objects. This key information, once identified, can be extracted to construct a pseudo-URL of the object. Further detail of pseudo-URL construction is given in subsequent sections of the present description.

The pseudo-URL, once constructed, is associated with object A. When any document in the collection of documents is identified to make another mention, or a reference in any detectable form, of the object A, the mentioning or reference is assigned with the same pseudo-URL and thus associated with the same object A.

It is noted that the pseudo-URL is not limited to any format, unlike a conventional URL which is rather rigidly formatted (e.g., as in http://office.microsoft.com/en-us/templates/ . . . ). Any digital content, such as a text, that can effectively serve as an identifier (preferably a unique identifier) of a search object can be used as a pseudo-URL for the search object.

The pseudo-URL, however, is not the same as an ordinary text. Once extracted and identified, the pseudo-URL is given an active function to associate with its corresponding object. In this sense, the pseudo-URL is functionally analogous to a conventional URL.

At block 120, the process for extracting pseudo-anchor text is also started once the pseudo-URL is identified and extracted. Unlike conventional anchor text extraction which is done in a single step upon extracting the URL, pseudo-anchor text is preferably extracted using multiple steps. This is because the conventional anchor text is predetermined by the HTML coding of the underlying document, while the pseudo-anchor and the associated pseudo-anchor text usually don't have such an explicit identifier.

In the embodiment shown in FIG. 1, candidate anchor blocks are first extracted at block 120 upon extraction of the pseudo-URL, and the final pseudo-anchor text is then extracted from candidate anchor blocks in a subsequent step. The method first accumulates candidate anchor blocks rather than pieces of anchor text. A candidate anchor block is a piece of text that contains possible descriptions of an object. The idea is to first construct a candidate anchor block to contain possible descriptions instead of extracting the anchor text for an object directly (a difficult task due to lack of explicit identifying information). Accumulated candidate anchor blocks contain useful information to provide a basis for a more focused investigation about which pieces of text should be selected as anchor text.

Referring back to the example where document D makes a reference to object A, in addition to the key information that is used for pseudo-URL extraction, further descriptions of object A may also exist in the vicinity of the reference point of object A in document D. Such further descriptions, together with the key information of the object, serve as a basis for extracting candidate anchor blocks. Both the key information and the additional information related to object A in document D can be treated as an anchor item of object A. It is desirable to acquire as many as possible anchor items related to a search object. Techniques to accomplish this goal are described in further detail in subsequent sections of the present description.

At block 130, pseudo-links are generated based on the pseudo-URL. Using pseudo-links is an optional but straightforward way to associate a pseudo-URL with an object. In some embodiments, a pseudo-link may also link the pseudo-anchor to the search object through the pseudo-URL. The pseudo-link is not required to be like the HTML type links that are explicit, clickable and with a predetermined standard format, but can take any form as long as it is operational for a computer to identify the link between the pseudo-anchor (with its pseudo-URL) and the search object.

Pseudo-links may be used in a way analogous to, but not necessarily the same as, how hyperlinks are used for linking a conventional URL and the object. Given a pseudo-URL and an associated object, implementing such a link may be done by any suitable method known in the art.

At block 140, candidate anchor blocks are grouped and accumulated according to their respective pseudo-URL.

Block 150 indicates that objects with their candidate anchor blocks are identified and presented. To do this, pseudo-URL of the object is used for merging information belonging to the same object.

At block 160, pseudo-anchors are extracted from the accumulated candidate anchor blocks.

Block 170 indicates that objects with their pseudo-anchor text are presented.

Pseudo-anchor text is then made available for search. The terms and phrases in the pseudo-anchor text may be used for matching a search query. References to a certain search object in the documents may be used for ranking the object in a search result. For example, an object that has been referenced in a greater number of documents may be ranked higher than another object. More important, the pseudo-anchor text provides an objective external opinion of search objects and may be advantageously used to improve the search performance by ranking the objects according to their respective pseudo-anchor text.

When used in actual search application, a search engine is adapted for executing the above-described a method. Upon receiving a user search query, the search engine provides a list of objects which the search engine ranks as the most relevant. Each entry of the search result may correspond to either a unique object or a collection of objects, depending on the design of the search engine and its user interface.

Unlike a conventional URL which always points to a Web page, a pseudo-URL may be associated with its object in a variety of ways. For example, in a case where the object is an article, the pseudo-URL may be linked to a copy of the article hosted either on the search server or an external computer. The pseudo-URL may also be linked to a compilation of the article (such as a summary of the article, a collection of highlights of the article, or even a collection of citations, comments, or reviews of the article) instead of the article itself. In a case where the object is a particular image, the pseudo-URL may be linked to a file of the image. In a case where the object is an image of a particular subject (e.g., a certain type of a flower), the pseudo-URL may be linked to a collection of images of the same subject. Likewise, in a case where the object is a product, the pseudo-URL may be linked to a collection of Web pages having an offer-for-sale of the product, a collection of Web pages or other documents containing reviews of the product, or a collection of images of the product, and so on, depending on the design and purpose of the search engine.

As shown above, the embodiment of the method in FIG. 1 adopts a three-phase methodology to extract pseudo-anchors. In the first phase, for each time an object appearing (mentioned or referenced) in a document, a candidate anchor block is extracted for the object. Candidate anchor blocks belong to the same object are grouped in the second phase. In the third phase, the ultimate pseudo-anchor text of each object is extracted by considering all candidate blocks of the object.

The search method described herein may be implemented with the help of one or more computer-readable media having computer-readable instructions thereon. The computer computer-executable instructions enable a computer processor to perform the acts of the methods. These acts may include: (1) extracting from a digital corpus an object; (2) extracting from the digital corpus a pseudo-anchor text associated with the object; and (3) making the pseudo-anchor text available for searching. As described above, a pseudo-URL representing an object may be extracted as an identifier of the object, and the pseudo-anchor text associated with the pseudo-URL may be then extracted. To extract pseudo-URL, entity information concerning the object is first extracted. The entity information usually includes a key information piece identifying the object. The pseudo-URL is then constructed using the key information.

As also described herein, the computer-readable instructions may be programmed to enable the computer processor to extract a pseudo-anchor text associated with the object by first collecting a set of candidate anchor blocks and then extracting the pseudo-anchor text from the set of candidate anchor blocks.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-ex-complete instructions may either be delivered in a tangible physical memory device or transmitted electronically.

Figure 2:
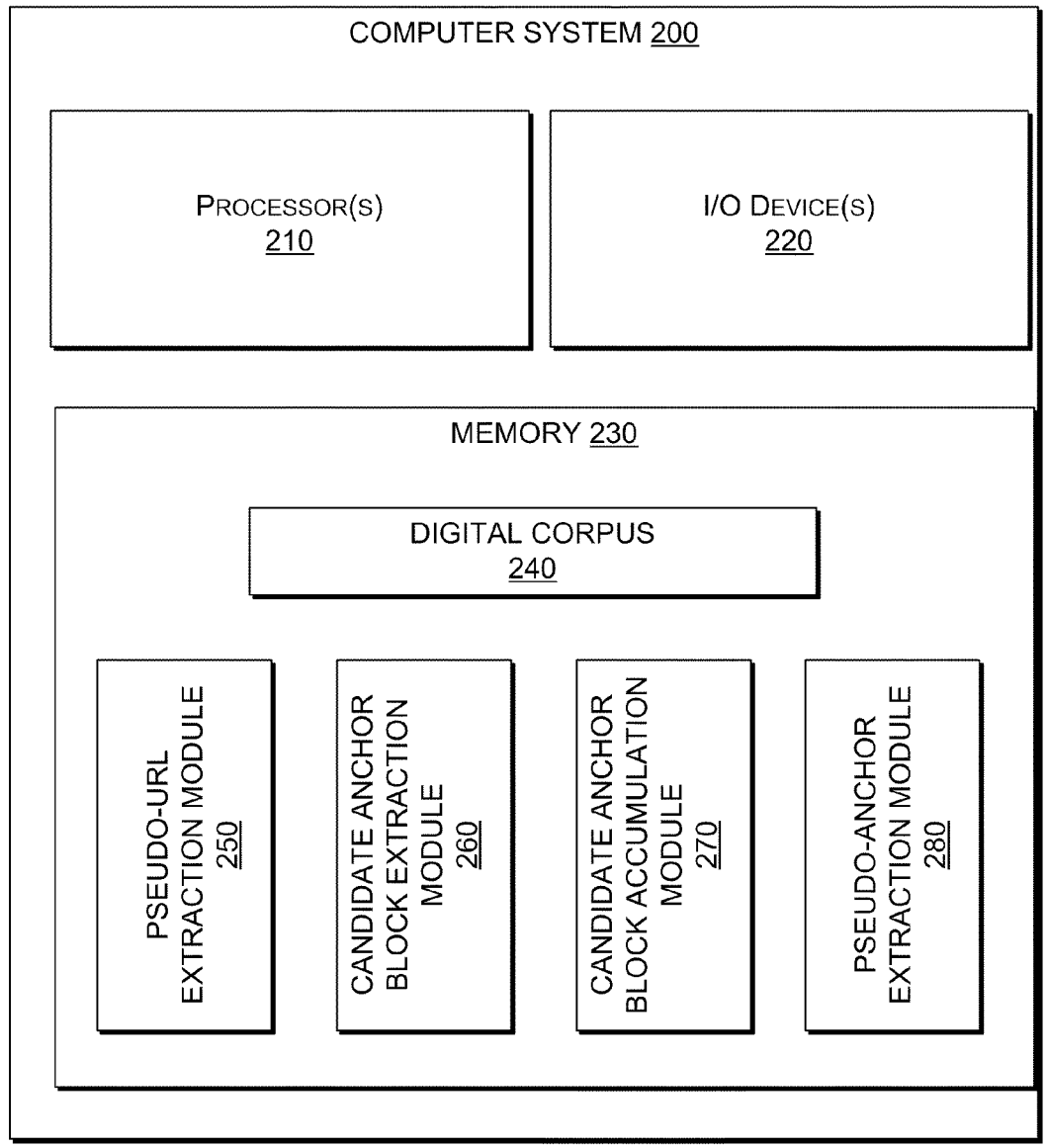
FIG. 2 shows a computer system implemented with program modules for pseudo-URL and pseudo-anchor extraction.

FIG. 2 shows a computer system implemented with program modules for pseudo-URL and pseudo-anchor extraction. Computer system 200 includes processor(s) 210, I/O devices 220 and memory 230. Stored in memory 230 are digital corpus 240 and four program modules: pseudo-URL extraction module 250, candidate anchor block extraction module 260, candidate anchor block accumulation module 270, and pseudo-anchor extraction module 280. These modules are designed to enable the computer system to perform the above-described acts. Both existing techniques and techniques described herein may be used to aid the implementation of some of these modules.

The search method may also be implemented in a computer system for generating a search result upon receiving a query.

Figure 3:
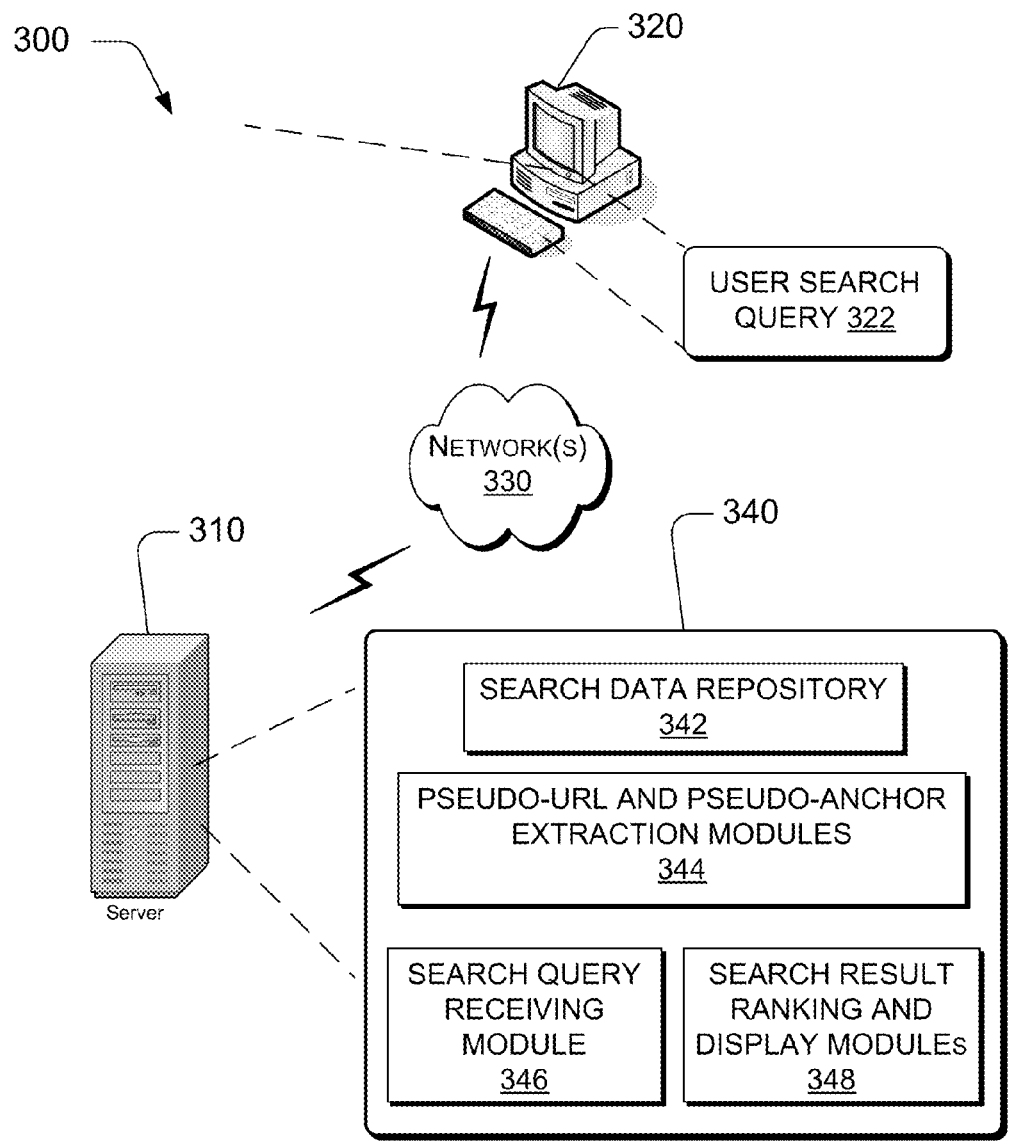
FIG. 3 shows a network computer system for searching using pseudo-URL and pseudo-anchor extraction method.

FIG. 3 shows a network computer system for searching using pseudo-URL and pseudo-anchor extraction method. The network computer system 300 includes search server 310 and user computer 320, both connected through network(s) 330. A user (not shown) generates user search query 322 on user computer 320 and sends search query 322 to search server 310 over network(s) 330. The server computer 310 may have a similar structure as the computer system 200 shown in FIG. 2. For example, server computer 310 may have one or more processors (not shown), one or more I/O devices (not shown), and one or more computer-readable media 340. Computer-readable media 340 may be a storage device containing a digital corpus stored in search data repository 342, and pseudo-URL and pseudo-anchor extraction modules 344 (such as that shown in FIG. 2). These modules 344 process the digital corpus to construct an indexed search data collection which is also stored in search data repository 342. The indexed search data collection constructed using the techniques described herein may be a collection of digital objects extracted from the digital corpus. At least some of the digital objects are each associated with a pseudo-anchor text.

Computer-readable media 340 further has search query receiving module 346 programmed to enable search server 340 to receive user search query 322, and search result ranking and display modules 348 programmed to enable search server 340 to rank and display search results. Upon receiving user search query 322, search result ranking and display modules 348 find matching search objects, rank and display them according to the indexed search data collection stored in search data repository 342.

Using the techniques described herein, the ranking of the digital objects may be assisted using the associated pseudo-anchor text. For example, processed with pseudo-URL and pseudo-anchor extraction modules, the index search data collection may incorporate pseudo-URL and pseudo-anchor information to improve search performance as described herein.

In the following subsections, this description illustrates main functionalities, implementation challenges, and existing techniques for each module discussed above.

Pseudo-URL Extraction

This step with its corresponding module is for identifying and extracting vertical objects from a document. The step may be accomplished using any suitable method for entity extraction or information extraction (especially Web information extraction). Many techniques have been proposed for extracting an entity (such as a name) or other type of information. These techniques range from rule-based methods to machine-learning approaches.

Examples of entity extraction include that disclosed in M. Collins and Y. Singer, Unsupervised Models for Named Entity Classification (Proc. of the Joint SIGDAT Conference on Empirical Methods in Natural Language Processing and Very Large Corpora, 1999); and in D. M. Bikel et al., Nymble: A High-Performance Learning Name-Finder (Proceedings of ANLP: 194-201, 1997).

Examples of information extraction include that disclosed in I. Muslea, Extraction Patterns for Information Extraction Tasks: A Survey (Proceedings of AAAI Workshop on Machine Learning for Information Extraction; Orlando, Fla., July 1999); M. E. Califf and R. Mooney; Relational Learning of Pattern-Match Rules for Information Extraction (Proceedings of the National Conference on Artificial Intelligence, 1999); and D. Freitag, Information Extraction from HTML: Application of a General Learning Approach (Proceedings of the 15th Conference on Artificial Intelligence (AAAI-98): 517-523).

This step may be quite straightforward for certain types of vertical objects (e.g. Web images, research papers in well-formatted research documents, etc). However, for other vertical objects such as products and people, this step may pose a greater challenge. For more sophisticated Web object extraction, technologies to efficiently identify the key attributes of vertical objects as disclosed in the following articles may also be used: Z. Nie et al., Extracting Objects from the Web (ICDE 2006); and J. Zhu et al., Simultaneous Record Detection and Attribute Labeling in Web Data Extraction (SIGKDD 2006).

In image search, the pseudo-URL may be constructed from the digital content (e.g., the actual pixels) of each image, instead of the image's traditional URL link. One way of generating the pseudo-URL of an image is to compute a hash value (e.g., SHA-1 hash value, http://en.wikipedia.org/wiki/SHA-1) of the digital content and use the hash value as a basis for constructing the pseudo-URL. An image may be accompanied by certain textual information, such as a certain type of summarization of the image, or a title and a description of the image. In this case, although it is possible to use such textual information as a basis for constructing the pseudo-URL for the image, it may be preferred that the pseudo-URL still be constructed using the digital content of the image while leaving the textual information for pseudo-anchor construction.

Candidate Anchor Block Extraction

This step with its corresponding module extracts pieces of text as candidate anchor block of an object. Each occurrence of an object in a document may be considered as a reference point to the object. Under this notion, the surrounding text around a reference point is commonly related to the object referenced. Therefore one primary way to construct a candidate block is surrounding text extraction. The simplest surrounding text extraction approach is to consider all text within a threshold distance from the reference point.

For image search, surrounding text for images may be extracted by analyzing HTM tags. In an extreme case, the entire document (or paragraph) containing an object can be considered as a candidate anchor block of the object. For HTML documents, vision-based Web page segmentation technology such as that disclosed in S. Yu et al., Improving Pseudo-Relevance Feedback in Web Information Retrieval Using Web Page Segmentation (Proceeding of the Twelfth World Wide Web conference (WWW 2003), 11-18, Budapest, Hungary, May 2003), may be used to extract the anchor blocks.

Candidate Anchor Block Accumulation

After the documents are processed, the extracted candidate anchor blocks are accumulated according to their related pseudo-URLs. This step with its corresponding module merges the candidate blocks of the same search object. Preferably, all candidate blocks of the same search objects are emerged together.

Pseudo-URLs are often inaccurate descriptions of vertical objects. Different pseudo-URLs may correspond to the same object. The challenge in this module is how to merge different pseudo-URLs of the same object in an effective way with high accuracy. This will be discussed further in a subsequent section Candidate Anchor Block Accumulation.

Pseudo-anchor Extraction

This step with its corresponding module is for extracting anchor text for each object based on its candidate blocks which have been accumulated. One embodiment of this module utilizes state-of-the-art data integration techniques for merging candidate anchor blocks belonging to one object, and then extracts pseudo-anchor text using a machine-learning based anchor text extraction method. Further detail of pseudo-anchor extraction is described in a subsequent section Pseudo-Anchor Text Extraction by Machine Learning.

Candidate Anchor Block Accumulation

This step with its associated module addresses the following problem: given a large number of pseudo-URLs for search objects, identify and merge pseudo-URLs that represent the same object. This problem is similar to that encountered in the record linkage, entity matching, and data integration, which have been extensively studied in database, artificial intelligence (AI), and other areas. Various techniques are available for implementing this module, and a preferred approach, as described below, is to achieve a trade-off between accuracy and efficiency.

Similarity measurement and the efficiency of the algorithm are the two primary aspects in accumulating candidate anchor blocks. First, a proper similarity function is used to identify two or more pseudo-URLs representing the same object. Second, the integration process should preferably be accomplished efficiently.

Given a vertical search domain, a domain-specific similarity function can be defined to calculate the similarity between any pair of pseudo-URLs. When the similarity value is larger than a threshold, it is considered that there is a high probability that the two objects are the same.

For example, a carefully designed similarity function is capable of determining that the two paper objects in the following are actually the same paper.

Pseudo-URL 1:

Title: E#icient Crawling Through URL Ordering

Authors: J Cho, H Garcia-Molina, L Page

PubInfo: WWW7/Computer Networks

Year: 1998

Pseudo-URL 2:

Title: Efficient Crawling Through URL Ordering

Authors: J Cho, H Garcia-Molina, L Page

PubInfo: In Proceedings of International World Wide Web Conference

In the above, Pseudo-URL 1 contains a misspelled word "E#icient" either caused by a typo or an error of PDF-to-text conversion. The two pseudo-URLs also differ from each other in some other details. However, a carefully designed similarity function is able to decide that these two pseudo-URLs represent the same book.

Similarly, if domain knowledge (e.g., knowledge of computer products) is adopted, a carefully designed similarity function is capable of determining that the following three pseudo-URLs represent the same product object:

Pseudo-URL 1: Dell Latitude C640
Pseudo-URL 2: Dell C640
Pseudo-URL 3: Dell Latitude C640 Laptop One commonly used domain-independent similarity function is edit distance method as disclosed in VI Levenshtein, Binary Codes Capable of Correcting Deletions, Insertions and Reversals (Soviet Physics—Doklady, 1966). Other techniques, such as adaptive entity matching functions that can be trained to obtain better performance in a particular domain may also be used. One example of such adaptive entity matching function is disclosed in W. Cohen and J. Richman, Learning to Match and Cluster Large High-Dimensional Data Sets (In Proc. of 8th ACM SIGKDD Int. Conf. on Knowledge Discovery and Data Mining, 2002).

Other methods, including existing methods for decreasing similarity calculation operations, may also be used. One example of such methods is disclosed in A. McCallum, K. Nigam, and L. Ungar, Efficient Clustering of High-Dimensional Data Sets with Application to Reference Matching (In Proc. 6th ACM SIGKDD Int. Conf. on Knowledge Discovery and Data Mining). In that disclosure, a method is proposed to solve the high dimensional data clustering problem by dividing data into overlapping subsets called canopies according to a cheap, approximate distance measurement. Then the clustering process is performed by measuring the exact distances only between objects from the same canopy. An inverted index can be used as a cheap distance metric to construct canopies.

Other subspace methods in data clustering areas may also be used. For example, data may be divided into subspaces of high dimensional spaces first and then processing is done in these subspaces. In addition, fast blocking approaches for record linkage in may also be used.

For improving efficiency, a shingling approach to detect similar Web pages is disclosed in Broder et al, Syntactic Clustering of the Web (In Proceedings of the Sixth International World Wide Web Conference, pp. 39 1-404, 1997). According to that disclosure, it is infeasible to compare sketches (which are generated by shingling) of all pairs of documents. Using the disclosed method, an inverted index that contains a list of shingle values and the documents in which the shingle values appear may be built. With the inverted index, a list of all pairs of documents that share any shingles, along with the number of shingles the documents have in common, may be generated.

For search applications that involve processing a large number of pseudo-URLs, the efficiency is especially important. It could take too much time or resources to compute the similarity of every pair of pseudo-URLs, considering that roughly $10^{12}$ similarity computation operations are needed for 1 million objects. A preferred approach, an embodiment of which will be described in further detail in a subsequent section, is to use a classifier to select subsets of the pseudo-URLs and compute the similarity of the pairs of pseudo-URLs in the subsets only.

Combining and modifying some of the above techniques and applying them to the pseudo-URL matching problem, a possible method can be defined as follows.

Algorithm: Multiple Feature-String Hashing for candidate block accumulation
Input: A list of objects (with their pseudo-URLs and candidate anchor blocks)
Output: A list of objects, with all candidate anchor blocks of the same object aggregated
Initial: An empty hashtable h (each slot of h is a list of objects)

```
For each object A in the input list {
    For each feature-string of A {
        Lookup by the feature-string in h to get a slot s;
        Add A into s;
    }
}
For each slot s with size smaller than a threshold {
    For any two objects A1, A2 in s {
        float fSim = Similarity(A1, A2);
        if(fSim > the specified threshold) {
            Merge A1 and A2;
        }
    }
}
```

Figure 4:
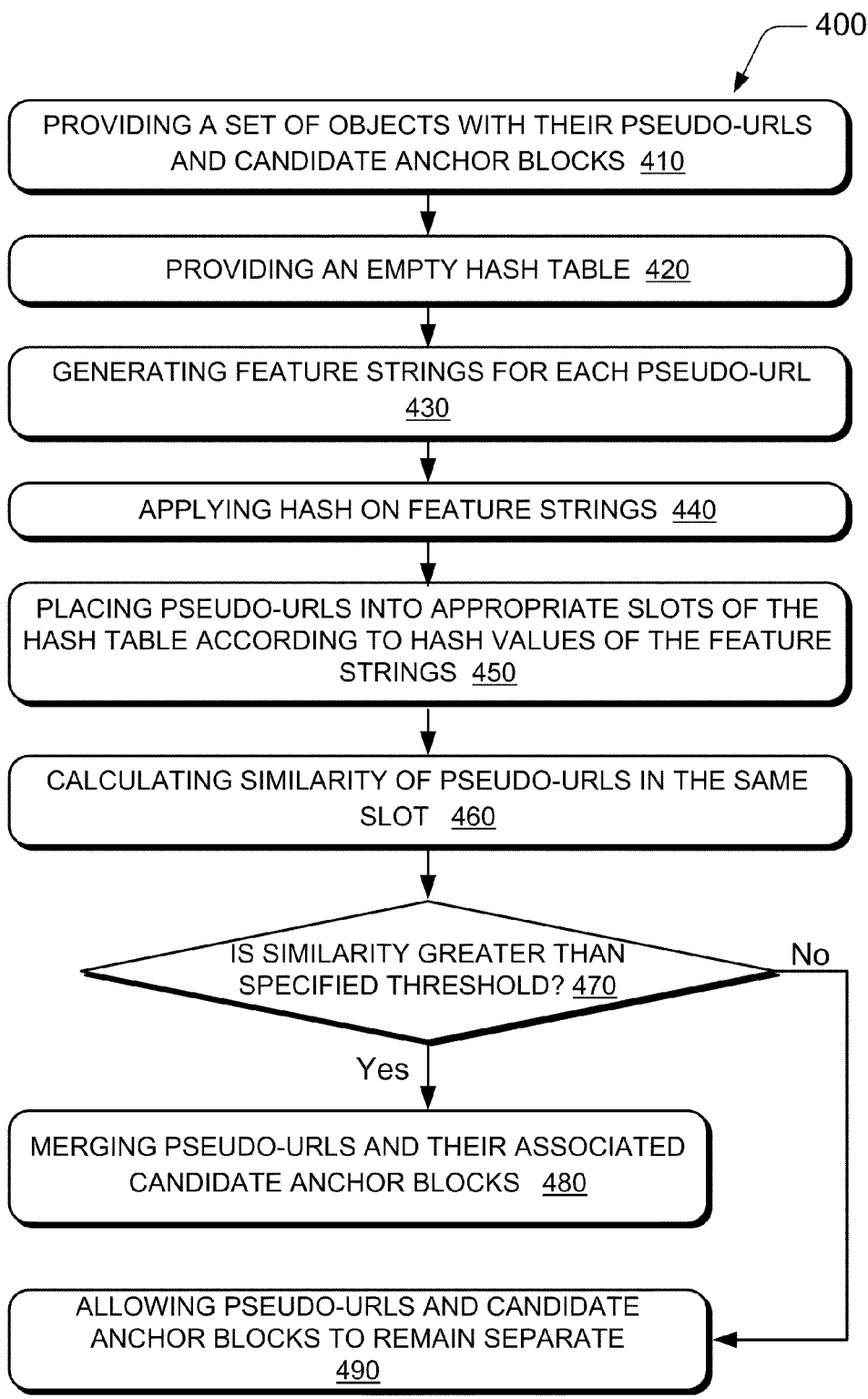
FIG. 4 shows an exemplary process implementing multiple feature-string hashing algorithm for candidate block accumulation.

FIG. 4 shows an exemplary process implementing multiple feature-string hashing algorithm for candidate block accumulation. The exemplary process 400 has multiple blocks as illustrated below.

At block 410, a set of objects with their pseudo-URLs and candidate anchor blocks is provided.

At block 420, an empty hash table is provided.

At block 430, feature strings are generated for each pseudo-URL.

At block 440, a hash function is applied on each feature string to generate a hash value for the feature string.

At block 450, pseudo-URLs are placed into appropriate slots of the hash table according to the hash values of their feature strings.

At block 460, the similarity of pseudo-URLs in the same slot is determined by applying a similarity function.

At block 470, the similarity of each pair of pseudo-URLs is compared to a specified threshold value. If the similarity is greater than the specified threshold value, the process proceeds to block 480 where the pseudo-URLs and their candidate anchor blocks are merged to be associated with the same search object. If the similarity is not greater than the specified threshold value, the process proceeds to block 490 where the pseudo-URLs and their candidate anchor blocks are allowed to remain separate and be associated with different search objects.

The above defined algorithm is preferably used in the candidate block accumulation module. The method constructs a certain number of feature strings for a pseudo-URL and generates a hash for the feature strings. A feature string of an object is a small piece of text which records a part of the object's key information. A pseudo-URL typically has several feature strings within. For two pseudo-URLs that are essentially different representations of the same object, the probability that they have at least one common feature string is extremely high.

Different kinds of vertical objects may need to define different kinds of feature strings. For example, for book objects, feature strings can be n-grams of book titles. Some search objects may not even have explicit feature strings. For example, in image search, the images may carry no such textual information. In this case, the pseudo-URL of an image may be constructed by computing a hash value of the image content (e.g., the pixels of the image). The hash value of the image content may be treated as an equivalent of a text string to define feature strings.

It is worth noting that although two identical objects are extremely likely to have at least one common feature string, two objects having one feature string in common may not necessarily be identical or even similar.

The algorithm maintains an in-memory hash-table which contains a large number of slots each having a list of pseudo-URLs belonging to this slot. For each pseudo-URL, feature strings are generated and hashed by a specified hash function. The pseudo-URL is then added into one or more slots according to the hash values of its feature strings. Two pseudo-URLs belonging to the same slot are further compared by utilizing a carefully designed similarity function. If their similarity is larger than a threshold, then the two pseudo-URLs are thought to be associated with the same object and therefore their candidate anchor blocks are merged.

The above algorithm achieves a good balance between accuracy and performance. In comparison to the naïve algorithm of performing one-one comparison between all pairs of pseudo-URLs, the algorithm needs only to compare pseudo-URLs that share a common slot. Although this may potentially be a trade-off, most pseudo-URLs representing the same object can be detected and merged using this algorithm because of the special property of feature strings.

In one embodiment, the algorithm does not count the number of common feature strings between pseudo-URLs. The algorithm may simply compare any two pseudo-URLs in the same slot by using domain-specific similarity functions directly. However, in other embodiments, the algorithm may calculate common bins (or inverted indices) between data points as a "cheap distance" for creating canopies, or calculate the number of common Shingles between two Web documents such that Jaccard similarity could be used to measure the similarity between them.

The duplication detection quality of this algorithm is determined by the appropriate selection of feature strings. The overall performance of this algorithm depends on size of each slot, especially the number and size of big slots. Big slots (slots with size larger than a threshold) may be discarded in the algorithm to improve the performance, just like removing common Shingles. The performance of the algorithm may be optimized by testing with different feature string functions and different slot size thresholds.

In a case where the search subjects carry no explicit textual information, the hash values of the image content may be treated as an equivalent of a text string to define feature strings. When two images from two different sites result in an identical hash value, the two images may be considered as the same image and can be merged (e.g., placed in the same group or in the same data bin). When images from different sites are merged, their candidate anchor blocks can also be merged and anchor text be extracted, in a manner similar to that in academic paper search which is discussed further below. Furthermore, image content detection techniques can also be adapted to group similar (but not exactly the same) images together.

With proper pseudo-URL extraction method and candidate anchor block accumulation method, pseudo-anchors may be extracted and made available for search.

Figure 5:
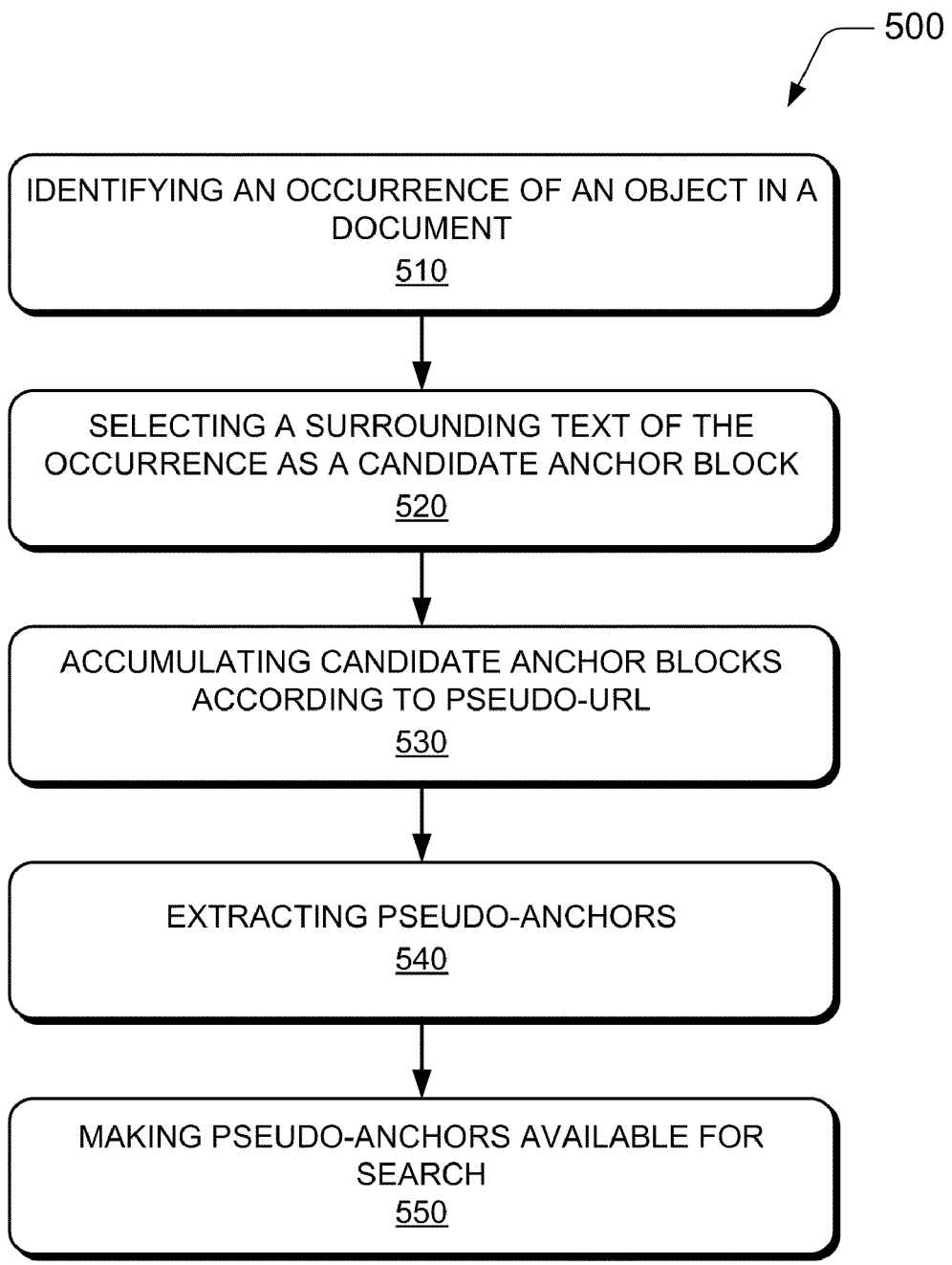
FIG. 5 shows an exemplary process of extracting pseudo-anchors for a search purpose.

FIG. 5 shows an exemplary process of extracting pseudo-anchors for a search purpose. The exemplary process 500 has multiple blocks which are described below.

At block 510, an occurrence of an object in a document is identified.

At block 520, the surrounding text of the occurrence is selected as a candidate anchor block.

At block 530, candidate anchor blocks are accumulated according to their pseudo-URL using the method illustrated above.

At block 540, pseudo-anchors are extracted from the accumulated candidate anchor blocks.

At block 550, the extracted pseudo-anchors are made available for search.

Pseudo-anchor extraction may be further aided by machine-learning techniques. Assuming that candidate anchor blocks for each object have been accumulated, machine-learning algorithms may be adapted for assisting extracting pseudo-anchor text for an object.

For objects of different types and in different domains, their candidate anchor blocks may share some common structures. Most candidate anchor blocks may be pieces of text with reference points therein. A reference point is an occurrence of an object in a document.

TABLE 1 lists an exemplary paper object (in academic search domain) with its candidate anchor text, and TABLE 2 lists an exemplary product object (in the product search domain) with its candidate anchor test. Reference points of the object are indicated by bold and italic text.

TABLE 1

A Research Paper Object and Its Candidate Anchor Text

| | |
|---|---|
| Paper Object | Scaling Personalized Web Search |
| Candidate anchor text | . . . Haveliwala [8] and Jeh and Widom [9] have done work on efficient personalization, observing that the function mapping reset distributions to stationary distributions is linear . . .<br>. . . A more recent investigation, [12], uses a different approach: it focuses on user profiles . . .<br>. . . providing personalized ranking of Web pages based on user preferences, while automating the input generation process for the PPR algorithm [8] . . .<br>. . . A partial solution to this scaling problem was given in [16], where the dependence from the number of topics . . . |

TABLE 2

A Product Object and Its Candidate Anchor Text

| | |
|---|---|
| Paper Object | Dell Latitude C640 |
| Candidate anchor text | . . . Dell C640 Intel Pentium 4-M 2 GHz/14.1-Inch/256 MB DDR/20HDD/ CD-ROM/Windows XP Pro . . . Price: $649.99 Description from SHOP.COM: TigerDirect.com: Dell Latitude C640 Refurbished Notebook PC Dell Latitude notebooks meet the wide-ranging needs of business and institutional |

TABLE 2-continued

A Product Object and Its Candidate Anchor Text

Paper Object  Dell Latitude C640 customers - needs that include powerful performance, portability, and flexibility . . .
. . . Dell Latitude C640 WHAT'S HOT: The Latitude C640--refresh of another Dell business-focused laptop, the Latitude C610--has a modular bay located conveniently on the front that can hold an optical drive . . .
. . . Electronics & Computers > Computers & Printers > Computers > Laptops
Dell Latitude C640 1.8 GHz Pentium 4-M 256 MB/40 GB DVD-ROM Notebook Computer . . .

Since objects in many different domains have an anchor block representation similar to that illustrated in the above TABLE 1 and TABLE 2, the process described in the following may be used in an algorithm for pseudo-anchor text extraction.

A candidate anchor block is defined as a piece of text with one or more reference points specified, where a reference point is denoted by a <start_pos, end_pos> pair, namely Ref=<start_pos, end_pos>, where start_pos represents the start position and end_pos represents the end position. Under this notion, a candidate anchor block may be represented in the following format:

AnchorBlock=(Text, ref1, ref2, . . . )

Accordingly, a block set is defined to be a set of candidate anchor blocks:

BlockSet={AnchorBlock1, AnchorBlock2, . . . }

The algorithm is to solve the problem defined as follows: Given a block set containing N elements, extract from the block set text excerpts that satisfy certain desired conditions.

Here a block set is used to model candidate anchor blocks of an object. The goal of the algorithm is to extract text excerpts that best describe the object. It is noted that it may be possible that more than one text excerpts are extracted from one anchor block.

Various ways may be available for implement the process. Although it is possible to determine whether a piece of text is anchor text in a binary fashion (that is, with a yes or no two-way determination), it is one aspect of a preferred embodiment of the method to adopt a machine-learning approach to assign a discrete degree for each term as its anchor properties in each candidate anchor block. Assigning each term a fuzzy degree as a potential anchor maybe more appropriate than a binary judgment deciding between either an anchor-term or non-anchor-term. A machine-learning approach can be more flexible and more universal than approaches that compute term degrees by a specially designed formula. Since the importance of a term for a link may be determined by many factors in some vertical search domains, a machine-learning approach may be desired to combine these factors.

For each term in every candidate anchor block, the goal of the algorithm is to learn a degree of belonging to anchor text, given the information provided by the candidate blocks.

To adopt a machine-learning approach, a classifier is selected and several features are generated for each term. Training data may also be generated for user labeling. The features may be extracted for each term in a candidate block and adapted for learning. Possible features for the learning purpose are shown in TABLE 3.

TABLE 3

Global Features Extracted

| Features | Description |
| --- | --- |
| DF | Document frequency: Number of candidate blocks in which the term appears, counted among all candidate blocks of all objects. DF is used to indicate whether the term is a stop word or not. |
| BF | Block frequency: Number of candidate blocks in which the term appears, counted among all candidate blocks of the current object. |
| DTF | Collection term frequency: Total number of times the term appearing in the block set. Each of multiple occurrences in one block is counted as a separate occurrence. |
| IsInURL | A parameter that specifies whether the term appears in the pseudo-URL of the object. |
| TF | Term frequency: Number of times the terms appearing in the candidate block. |
| Dist | Directed distance from the nearest reference point to the term location |
| RefPos | Position of the nearest reference point in the candidate anchor block |
| BlockLen | Length of the candidate anchor block |

It may be more effective if some of the above features are normalized before they are used for learning. For example, for a term in candidate anchor block B, its TF may be normalized by the BM25 formula:

$$TF_{norm} = \frac{(k_1 + 1) \cdot tf}{k_1 \cdot \left(b + (1-b) \cdot \frac{|B|}{L}\right) + tf}, \quad (2.1)$$

where L is average length of the candidate blocks, |B| is the length of B, and k1, b are parameters.

DF is normalized by the following formula:

$$DF_{norm} = \log\left(1 + \frac{N}{DF}\right), \quad (2.2)$$

where N is the number of elements in the block set (i.e. total number of candidate anchor blocks for the current object).

Features RefPos and Dist are normalized as follows, respectively, $$RefPos_{norm} = RefPos/|B|$$

$$Dist_{norm} = (Dist - RefPos)/|B|$$

And feature BlockLen is normalized as, $$BlockLen_{norm} = \log(1 + BlockLen)$$

In the learning algorithm, each term maybe labeled with an importance level. For example, four term importance levels, from 1 (unrelated terms or stop words) to 4 (terms or words that participate in describing the main properties of the object).

There are various existing machine-learning methods that may be adapted for the machine learning of the method described herein. For example, support vector machine (SVM) may be used because of its powerful classification ability and well generalization ability. Some other machine learning techniques may also be used.

The input of the classifier is a feature vector of a term and the output is the importance level of the term. Given a set of training data:

$$\{feature_i, level_i\}_{i=1}^{l},$$

a decision function f(x) can be acquired after training. Using the acquired decision function f(x), the algorithm can assign an importance level for each term automatically.

An Example: Academic Paper Search

The method disclosed in this description is applied to a specific search domain, namely searching for academic papers. The process and the results are described below.

Using a preparatory Libra paper search system, about 0.9 million paper objects are crawled from the Web and indexed. About 0.4 million of the paper objects have full-text in HTML format (converted from PDF format via a converter).

A method is developed to collect citation information of each cited paper as its anchor text. The process of extracting pseudo-anchor text for paper objects is an implementation of the following operations in academic domain: pseudo-URL extraction, candidate anchor block extraction, candidate block accumulation, and pseudo-anchor extraction.

Pseudo-URL Extraction:

In the academic search domain, when one paper cites (or links to) another paper, a simple reference symbol (e.g. "[1]", "[5-8]") is commonly inserted to represent the paper to be cited, and the detail information (key attributes) of the cited paper are typically placed at the end of the document (e.g., a separate reference section). A reference in the references section may be referred to as a reference item.

The method locates the reference section by searching for the last occurrence of term 'reference' or 'references' in larger fonts. The method then adopts a rule-based approach to divide the reference section into reference items. Another rule-based approach is used to extract paper attributes (title, authors, year, etc) from a reference item. Different text formats may be used in different papers citing the same paper object. The resultant paper objects may have some errors caused by the quality of HTML files converted from PDF format, reference item extraction errors, paper attribute extraction errors, and other factors.

The pseudo-URL for a paper object is defined according to its title, authors, publisher, and publication year, as these types of information can readily be used to identify a paper.

Candidate Anchor Block Extraction:

Observing that most papers include the identity of the paper being cited in brackets, the method locates reference points by examining each character sequence between brackets "[" and "]" and looks up the associated material in the reference section. For each reference item, the method treats the sentence containing its reference point as a candidate anchor block. Another straightforward choice for a candidate anchor block is to use the paragraph containing the reference point.

Small percentage of exceptions may either be given special consideration or omitted for simplicity.

Candidate Block Accumulation:

All candidate blocks belonging to the same paper object are accumulated via the feature-string hashing algorithm described previously. One embodiment of the method uses term-level bigrams as feature strings. Other types of feature strings are also be used for testing. The similarity between two paper objects is computed as a linear combination of the similarities on the following fields: title, authors, publication venue (conference and/or journal name), and the publication year.

Pseudo-anchor Extraction:

The machine-learning approach previously described is adapted to assign weights for all terms in each anchor block. About 2000 candidate blocks are labeled for training the SVM classifier. Four importance levels are used in labeling the blocks. The features for training and testing are normalized versions of the features in TABLE 3.

Experiment results bear evidence to the performance of the search method and demonstrate the effect of pseudo-anchor text in improving the performance of searching paper objects in academic domain.

Experimental Setup:

All experiments are conducted based on Libra, an academic paper search system. About 0.9 million paper objects were crawled and extracted from the Web, with nearly 0.4 million of the paper objects having full-text. The 0.4 million papers are processed according to the method previously described. In processing the references of a paper (e.g., paper A), if the paper being referenced (e.g., paper B) is in the 0.9 million collection, the method accumulates B's candidate anchor block and increase B's citation count by one. Otherwise, this reference item is discarded. A rough citation count for each paper maybe acquired.

All the 0.9 million papers (with their anchor text) are indexed. For the 0.4 million papers with full text, their title, authors, abstract, year, and full-text are indexed, while for the remaining 0.5 million papers, only the first four fields are indexed. A naïve word breaker, which treats characters other than letters and digitals as punctuations, is utilized to separate document text into terms. All terms (stop words and non-stop words) are indexed without stemming.

About 300 queries were randomly selected from Libra's query log and sent to researchers and students for selection in an organization. Each researcher or student was free to choose queries based on personal expertise, or propose new queries according to the interest. Overall 88 queries were labeled. The labeled queries are distributed in information retrieval, machine learning, system, database, and other fields in computer science. Sample queries include:

Link analysis, Parallel computing, Grid computing, Association rules, Peer-to-peer measurement, Collaborative filtering, parameter estimation, High dimensional indexing, minimum cut, ...

For each query, the top 30 results of several ranking algorithms tested were mixed and labeled by researchers and students. Each result is assigned a relevance value from 1 (meaning "poor match") to 5 (meaning "perfect match"). The multiple judgment levels instead of the binary judgments widely used in information retrieval may be more suitable to precisely evaluate the relevance of an object to a query.

A nDCG (normalized DCG) measure is adopted in the experiments to evaluate search results. nDCG has two kinds of parameters: discount factor b, and gains for all labeled relevance levels. In the experiments, the value of the discount factor b is fixed to be 2, and the gain value for the five relevance levels (from 1 to 5) are 0.01, 1, 3, 7 and 15, respectively. For completeness, the five judgment levels are eventually transformed into binary judgments (with judgment level 1 and 2 treated as irrelevant, and other levels as relevant), and traditional IR evaluation metrics is used to evaluate the final results.

The performance of the search using pseudo-anchor techniques is compared with the performance of the searches using a baseline paper ranking algorithm, with or without using citation counts. The baseline algorithm considers the title, abstract, full-text and optionally the citation count of a paper.

Furthermore, the BM25 formula is used for each paper over its title, abstract, and full-text. The resulting score is then linearly combined with the normalized citation count of the paper to get a final score. The normalization formula for citation count is as follows, $$CitationCount_{norm} = \log(1 + CitationCount)$$

To test the ranking performance of including pseudo-anchor text, an anchor score for each paper is calculated and linearly combined with its baseline score (i.e. the score computed by the baseline algorithm).

The results of the experiment show that overall performance is significantly improved by including pseudo-anchor information. The improvement is not only evident in the numerical scoring as discussed above, but also evident in individual examples. For example, when pseudo-anchor information is utilized, the search results of a sample query "TF-IDF" showed excellent relevance in the top-three ranking returns (papers or books). It is believed that the main reason for the improvement is that these papers (or books) are described with "TF-IDF" when other papers citing them.

Experiments were also done to test the effectiveness and performance of the multiple feature-string hashing algorithm described herein. The duplication detection quality of this algorithm is determined by the appropriate selection of feature strings. When feature strings are fixed, the slot size threshold can be used to tune the tradeoff between accuracy and performance.

The performance of the algorithm depends on different feature strings and slot size thresholds. It is discovered that in the particular type of search experimented, bigrams achieve a good trade-off between accuracy and performance.

Conclusion

The methods and techniques disclosed in the present description aims to improve search (particularly vertical search) performance by utilizing pseudo-anchor information. As pseudo-URL and pseudo-anchor text can both be implicit in some vertical search domains, particular attention is given to the techniques for pseudo-anchor extraction. The present description discloses approaches for extracting pseudo-anchor information for search objects that lack explicit URL linking, as it is common for vertical search objects. The disclosed machine-learning approach has proven successful in automatically extracting implicit anchor text. Applications of the proposed framework to the academic search domain have seen a significant performance improvement over basic approaches.

The proposed machine-learning approach can also be applied to general Web search, as an alternative to the anchor window approach, for extracting more anchor text for a Web page.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented by a computer, the method comprising:
    identifying an object in content;
    identifying a first block of information associated with the object and a second block of information associated with the object;
    extracting the first block of information associated with the object and the second block of information associated with the object;
    aggregating the first block of information associated with the object and the second block of information associated with the object to obtain aggregated information associated with the object;
    constructing, by the computer, a pseudo uniform resource locator (pseudo-URL) of the object based at least on the information being extracted and aggregated;
    associating the pseudo-URL with the object;
    storing for repeated use, the pseudo-URL being associated with the object and the information being extracted; and
    providing, via the pseudo-URL, the information extracted for search.

2. A computer-implemented method as recited in claim 1, wherein the object lacks an associated uniform resource locator (URL).

3. A computer-implemented method as recited in claim 1, further comprising extracting pseudo-anchor text from the aggregated information associated with the object, wherein the pseudo-anchor text comprises the information extracted that is provided for search.

4. A computer-implemented method as recited in claim 1, wherein the content is one of a plurality of types of content, the plurality of types of content comprising a document, a compilation, an image, or a video.

5. A computer-implemented method as recited in claim 1, further comprising ranking search results based at least on the information extracted.

6. A computer-implemented method as recited in claim 1, further comprising parsing the content to construct a link associated with the pseudo-URL.

7. A computer-readable media having computer-readable instructions encoded thereon, the computer-readable instructions upon execution configuring a computer to perform the method recited in claim 1.

8. A system comprising:
    a processor;
    a memory coupled to the processor, the memory storing a plurality of modules, at least one of the plurality of modules upon execution by the processor performing pseudo-anchor text extraction comprising:

identifying an object in content;

identifying a first candidate anchor block associated with the object and a second candidate anchor block associated with the object;

extracting pseudo-anchor text from the first candidate anchor block and the second candidate anchor block, wherein the pseudo-anchor text being extracted includes text including a possible description of the object;

accumulating the pseudo-anchor text extracted from the first candidate anchor block and the pseudo-anchor text extracted from the second candidate anchor block to obtain pseudo-anchor text associated with the object;

constructing a pseudo uniform resource locator (pseudo-URL) of the object based at least on the pseudo-anchor text associated with the object;

associating the pseudo-URL with the object;

storing for repeated use, the pseudo-URL being associated with the object and the pseudo-anchor text associated with the object; and providing for search, via the pseudo-URL, the pseudo-anchor text associated with the object.

9. A system as recited in claim 8, wherein the at least one of the plurality of modules includes a pseudo uniform resource locator (pseudo-URL) extraction module that upon execution by the processor causes extraction of the pseudo-URL.

10. A system as recited in claim 8, wherein the at least one of the plurality of modules includes a candidate anchor block extraction module that upon execution by the processor causes the pseudo-anchor text from the first candidate anchor block and the pseudo-anchor text from the second candidate anchor block, to be extracted.

11. A system as recited in claim 10, wherein the at least one of the plurality of modules further includes a candidate anchor block accumulation module that upon execution by the processor causes the pseudo-anchor text extracted from the first candidate anchor block and the pseudo-anchor text extracted from the second candidate anchor block to be accumulated.

12. A system as recited in claim 8, wherein the at least one of the plurality of modules includes a pseudo-anchor extraction module to identify and extract the pseudo-anchor text associated with the object for use in search.

13. A system as recited in claim 8, further comprising a digital corpus available for pseudo-anchor text extraction.

14. A system as recited in claim 13, wherein the digital corpus comprises one or more of a plurality of types of content, the plurality of types of content comprising a document, a compilation, an image, or a video.

15. A computer-readable media having computer-readable instructions encoded thereon, the computer-readable instructions upon execution configuring a search engine to perform operations comprising:

identifying an object in content;

identifying a first candidate anchor block associated with the object and a second candidate anchor block associated with the object;

extracting the first candidate anchor block associated with the object and the second candidate anchor block associated with the object;

aggregating the first candidate anchor block associated with the object and the second candidate anchor block associated with the object to obtain pseudo-anchor text associated with the object;

extracting the pseudo-anchor text from the candidate anchor blocks that were aggregated;

constructing a pseudo uniform resource locator (pseudo-URL) of the object based at least on the extracted pseudo-anchor text;

associating the pseudo-URL with the object;

storing for repeated use, the pseudo-URL being associated with the object and the extracted pseudo-anchor text; and providing, via the pseudo-URL, the pseudo-anchor text extracted for search.

16. A computer-readable media as recited in claim 15, wherein the object lacks an associated uniform resource locator (URL).

17. A computer-readable media as recited in claim 15, wherein the content comprises one or more of a plurality of types of content, the plurality of types of content comprising a document, a compilation, an image, or a video.

18. A computer-readable media as recited in claim 15, the operations further comprising:

identifying pseudo-URLs for a plurality of objects;

parsing the content to construct a pseudo-link associated with the pseudo-URL.

19. A computer-readable media as recited in claim 15, the operations further comprising ranking search results based at least on the pseudo-anchor text.

20. A computer-readable media as recited in claim 15, the operations further comprising automatically assigning each term in each candidate anchor block a degree of belonging to pseudo-anchor text.

* * * * *